US006360870B1

(12) United States Patent
Wooldridge

(10) Patent No.: US 6,360,870 B1
(45) Date of Patent: Mar. 26, 2002

(54) FEEDING AND SORTING APPARATUS

(75) Inventor: Donald Wooldridge, Dunkirk, MD (US)

(73) Assignee: Batching Systems, Inc., Owings, MD (US)

( * ) Notice: Subject to any disclaimer, the term of this patent is extended or adjusted under 35 U.S.C. 154(b) by 0 days.

(21) Appl. No.: 09/632,852

(22) Filed: Aug. 4, 2000

Related U.S. Application Data
(60) Provisional application No. 60/166,752, filed on Nov. 22, 1999, and provisional application No. 60/166,754, filed on Nov. 22, 1999.

(51) Int. Cl.[7] ............................................. B65G 47/24
(52) U.S. Cl. ................................... 198/391; 198/446
(58) Field of Search .............................. 198/446, 391, 198/756, 757, 778

(56) References Cited

U.S. PATENT DOCUMENTS

| 4,775,284 A | * | 10/1988 | Musschoot | 198/550.01 |
| 4,981,208 A | * | 1/1991 | Jones | 198/778 |
| 5,024,320 A | * | 6/1991 | Musschoot | 198/756 |
| 5,031,751 A | * | 7/1991 | Pahlsson | 198/570 |
| 5,191,267 A | * | 3/1993 | Machacek | 318/67 |
| 5,191,960 A | * | 3/1993 | Wareham | 198/391 |
| 5,247,810 A | * | 9/1993 | Fenty | 62/374 |
| 5,259,302 A | * | 11/1993 | Chen | 99/405 |
| 5,277,301 A | * | 1/1994 | Fenty | 198/778 |
| 5,291,987 A | * | 3/1994 | Zink | 198/724 |
| 5,336,032 A | * | 8/1994 | Pipes | 414/331 |
| 5,413,213 A | * | 5/1995 | Golz et al. | 198/778 |
| 5,429,160 A | * | 7/1995 | Bardroff et al. | 141/72 |
| 5,447,223 A | * | 9/1995 | Dasgupta | 198/778 |
| 5,458,228 A | * | 10/1995 | Olsson | 198/778 |
| 5,544,732 A | * | 8/1996 | Shmitt | 198/392 |
| 5,702,245 A | * | 12/1997 | London | 432/14 |
| 5,804,772 A | * | 9/1998 | Wooldridge et al. | 177/116 |
| 5,836,721 A | * | 11/1998 | Wallace | 406/75 |
| 5,865,295 A | * | 2/1999 | Honegger | 198/604 |
| 5,913,428 A | * | 6/1999 | Graham | 209/676 |
| 5,960,929 A | * | 10/1999 | Graham | 198/391 |
| 6,029,797 A | * | 2/2000 | Olsson | 198/778 |
| 6,041,914 A | * | 3/2000 | Graham | 198/757 |
| 6,047,810 A | * | 4/2000 | Graham | 198/391 |
| 6,062,375 A | * | 5/2000 | Pupp | 198/778 |
| 6,092,641 A | * | 7/2000 | Draghetti | 198/406 |
| 6,129,200 A | * | 10/2000 | Graham | 198/380 |
| 6,161,675 A | * | 12/2000 | Graham | 198/391 |
| 6,257,392 B1 | * | 7/2001 | Graham | 198/396 |

OTHER PUBLICATIONS

"Syntron Parts Handling Equipment" catalog of FMC Corporation, Material Handling Equipment Division, Homer City, Pennsylvania, 1984.

"Parts Feeding Equipment" catalog of Automation Devices, Inc., Fairview, Pennsylvania, with inserts entitled "Stainless Steel Bowls" and "Model 6000 Series controller", published at least as early as 1994.

* cited by examiner

Primary Examiner—Christopher P. Ellis
Assistant Examiner—Rashmi Sharma
(74) Attorney, Agent, or Firm—Crowell & Moring LLP

(57) ABSTRACT

A feeding, singulating, or orienting device which includes a vibratory feeder bowl having a central receiving section and at least two tracks radiating outwardly from the receiving section. The feeder bowl can be convex, concave, or flat in vertical cross-section depending on the articles to be separated or oriented.

15 Claims, 11 Drawing Sheets

FEEDING AND SORTING APPARATUS

CROSS-REFERENCE TO RELATED APPLICATIONS

Applicant claims the benefit of priority under 35 U.S.C. §119(e)(1) of Provisional Applications Serial Nos. 60/166,752 and 60/166,754, both filed Nov. 22, 1999, both of which are incorporated herein by reference in their entireties.

BACKGROUND AND SUMMARY OF THE INVENTION

This invention relates to a device for separating articles, counting articles, or the like. More specifically, this invention relates to a device using an apparatus comprising a vibratory feeder bowl and a plurality of outwardly radiating tracks for separating articles, counting articles, or the like.

Vibratory feeder bowls for separating articles, counting articles, or the like are known. These feeder bowls comprise a central receiving section in the form of a cone or the like and a single ramp-like track along which the articles flow to a discharge. As can be seen from FIG. 15, the typical prior art apparatus comprises a vibratory feeder bowl 44 having a central receiving section 46 and a spiral track 48. The bowl is vibrated by a base unit 50. The track 48 can take a number of configurations and types of tooling depending on the nature of the articles to be separated, their size, their shape, and/or other characteristics. Typical bowl and track configurations are well-known in the art as illustrated, for example, in the "Parts Feeding Equipment" catalog of Automation Devices, Inc., of Fairview, Pa., U.S.A., or the "Syntron® Parts Handling Equipment" catalog of FMC Corporation, Material Handling Division, of Homer City, Pa., U.S.A. Well-known drive units are also shown, for example, in those two catalogs, both of which are incorporated herein by reference in their entireties. The vibration applied by the drive unit 50, causes the articles being oriented and/or separated to move outwardly to the periphery of the bowl 44. The articles to be separated continue to move outwardly and are guided by wall 52 to follow the spiral path of the ramp 48 until they reach the end where they drop off into a counter, weigher, or assembly machine, or any other device for further processing, such as packaging, etc. From the counter or weigher, the articles then move to further processing such as packaging. Counting, weighing, and other such devices are well-known in the art.

There is a disadvantage to the prior art devices in that they are slow and inefficient. A plurality of such devices must be used, each with its own vibration-producing mechanism.

It is, therefore, a primary object of the present invention to provide a vibratory feeder bowl apparatus for feeding, singulating, and/or orienting articles which is free of the above-mentioned and other such disadvantages.

The present invention provides a feeder bowl comprising a central receiving section and a plurality of tracks radiating outwardly from the receiving section. The feeder bowl itself is the same as conventional feeder bowls or can be a feeder bowl according to another aspect of the instant invention. It can be convex, concave, or flat in vertical cross-section depending on the articles to be separated or oriented. The choice of bowl configuration would be apparent to those skilled in the art. For instance, pills or tablets to be counted would be fed, oriented, or separated by using a convex bowl; irregularly shaped articles to be fed, oriented, or separated would be processed using a concave bowl; and spherical objects like marbles would be separated for counting using an essentially flat bowl. It should be noted that "convex" and "concave" bowls are, in actuality, essentially conical. The convex bowl resembles the outside surface of a cone while the concave bowl resembles the inside surface of a cone. As will be discussed later, when a concave bowl is used, it is preferable that it have spiral grooves radiating outwardly from the center. The bowl receives bulk product from bucket conveyors, bin vibratory elevators, and/or other similar delivery means.

While the conventional bowl uses a single spiral ramp-like track, the instant invention is an apparatus which comprises a plurality of outlets radiating outwardly from the periphery of the feeder bowl. The number of outlets can be as few as two with no upper limit except as dictated by physical constrains. It is possible that as many as about 50 could be used depending on bowl size and/or diameter, and track size. Specifically, the device has multiple tracks spiraling out from a center cone. The tracks all have tooling designed to shed bulk loose product down to single file feed, exiting product in controlled flow from the bowl around the entire periphery at the end of each track.

The bowl passes the excess overflow via an integral catch pan that provides a path for the bulk excess product to exit the bowl feeder from underneath the multiple tracks for a return run through the multi-track feeder.

At each exit, an optical parts detector, laser, light beam, load cell, or similar type device, with a product diverter gate, and an accumulator with discharge gates, is positioned to count or weigh the loose product into the desired batch count or weight size. These detectors may combine their counts for large batch sizes, or each be individually programmed to count each total batch or any combination of these optical batches and weighed batches satisfying their requested batch size. These devices are all well-known in the art and need no further description.

In another aspect of the instant invention, a new bowl configuration is provided for bulk product distribution that can deliver product uniformly and/or oriented in a controlled fashion out its entire periphery overflowing out of itself evenly and smoothly around a 360 degree circle. This bowl is designed to receive bulk product from bucket conveyors, bin vibratory elevators, and/or other similar delivery means. This device by nature of its design shape will collect the product in the bottom center of a cone, bowl or other similar shaped device. The bowl has spiral vanes, tracks, divertors, or other similar devices affixed to its interior surfaces that will guide and encourage the product to climb out of and spread itself evenly and uniformly out of the periphery of the device.

As with the first aspect of the instant invention, the bowl is driven by a conventional vibrator-electromagnetic pneumatic hydraulic and/or motor driven to impart motion to the product distribution device which in turn drives the product around up and out of the device.

Old technology has been to use a vibrating dome or cone with even distribution highly dependent on uniform delivery to the center of the cone resulting in fluctuations in delivery period. Entangled and not completely free flowing product like French fries, screws, wrapped candy, often result in unevenly distributed output flow out the periphery of the dome with some batch infeeds located around the distributor starving for produce while others may have too much bulk product.

Other objects, advantages and novel features of the present invention will become apparent from the following detailed description of the invention when considered in conjunction with the accompanying drawings.

DESCRIPTION OF PREFERRED EMBODIMENTS

Figure 1:
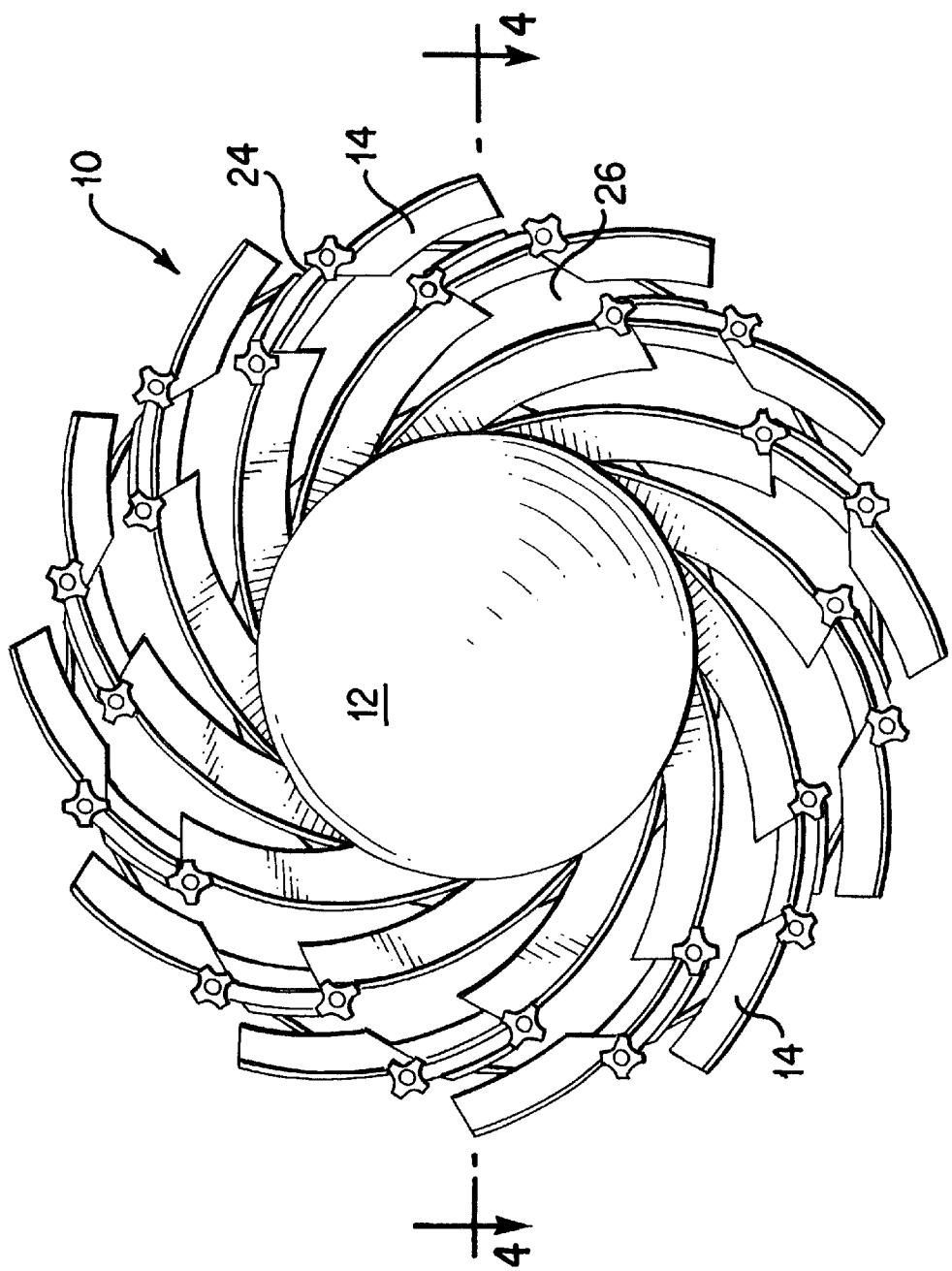
FIG. 1 is a plan view of a bowl feeder according to the invention.
Figure 2:
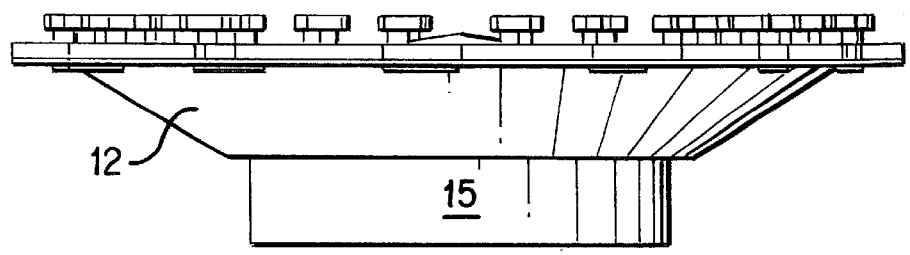
FIG. 2 is a side elevational view of the bowl feeder of FIG. 1.
Figure 3:
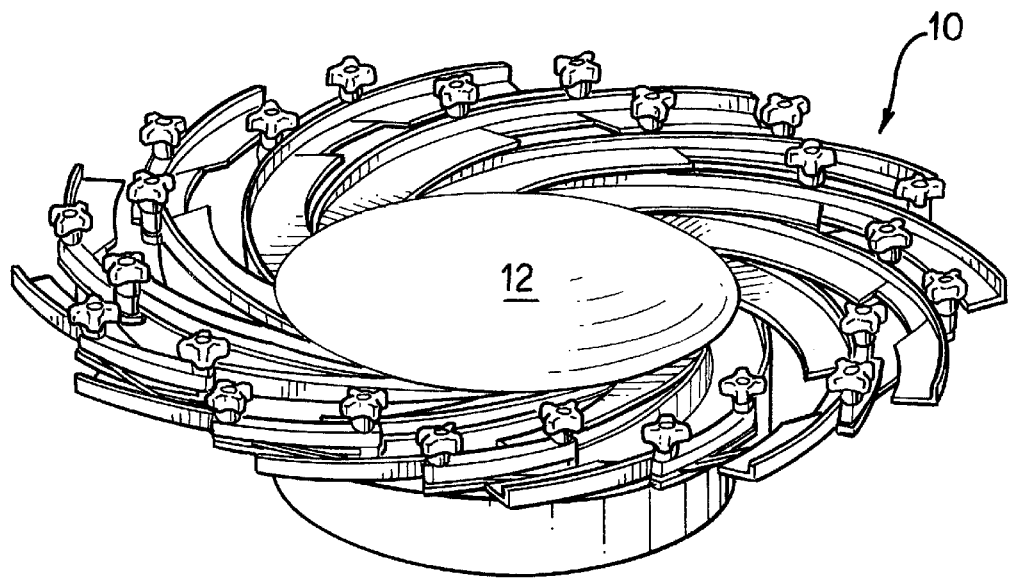
FIG. 3 is a perspective view from the top and front of the bowl feeder of FIG. 1.
Figure 4:
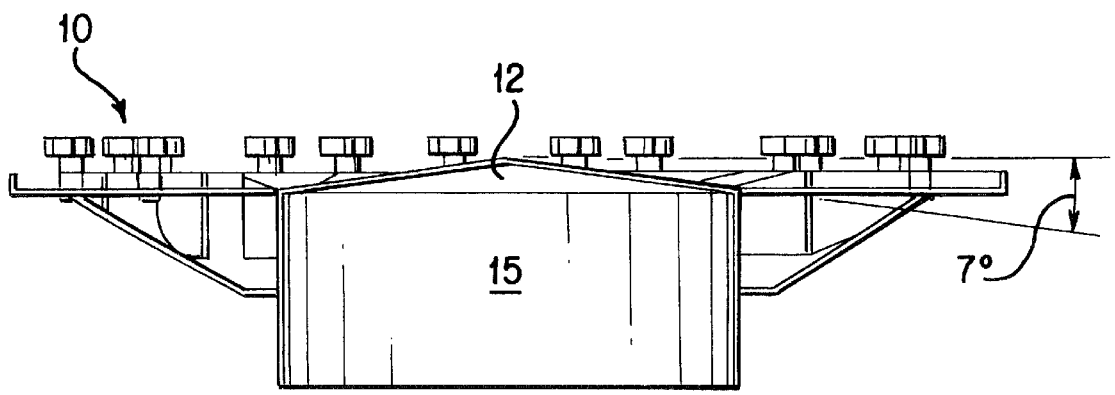
FIG. 4 is a cross-section of the bowl feeder taken along the line 4—4 of FIG. 1.

Referring to FIGS. 1–4, the bowl feeder of the present invention is generally designated by the numeral 10. The bowl feeder 10 comprises a central receiving section 12 and a plurality of tracks 14 spiraling out from the central receiving section. The complete apparatus is vibrated using a known vibrating drive 15. Depending on the nature of the items to be counted or separated, the device may alternatively be rotated instead of vibrated to cause the items to flow outwardly by centrifugal force rather than by the vibrations.

Figure 5:
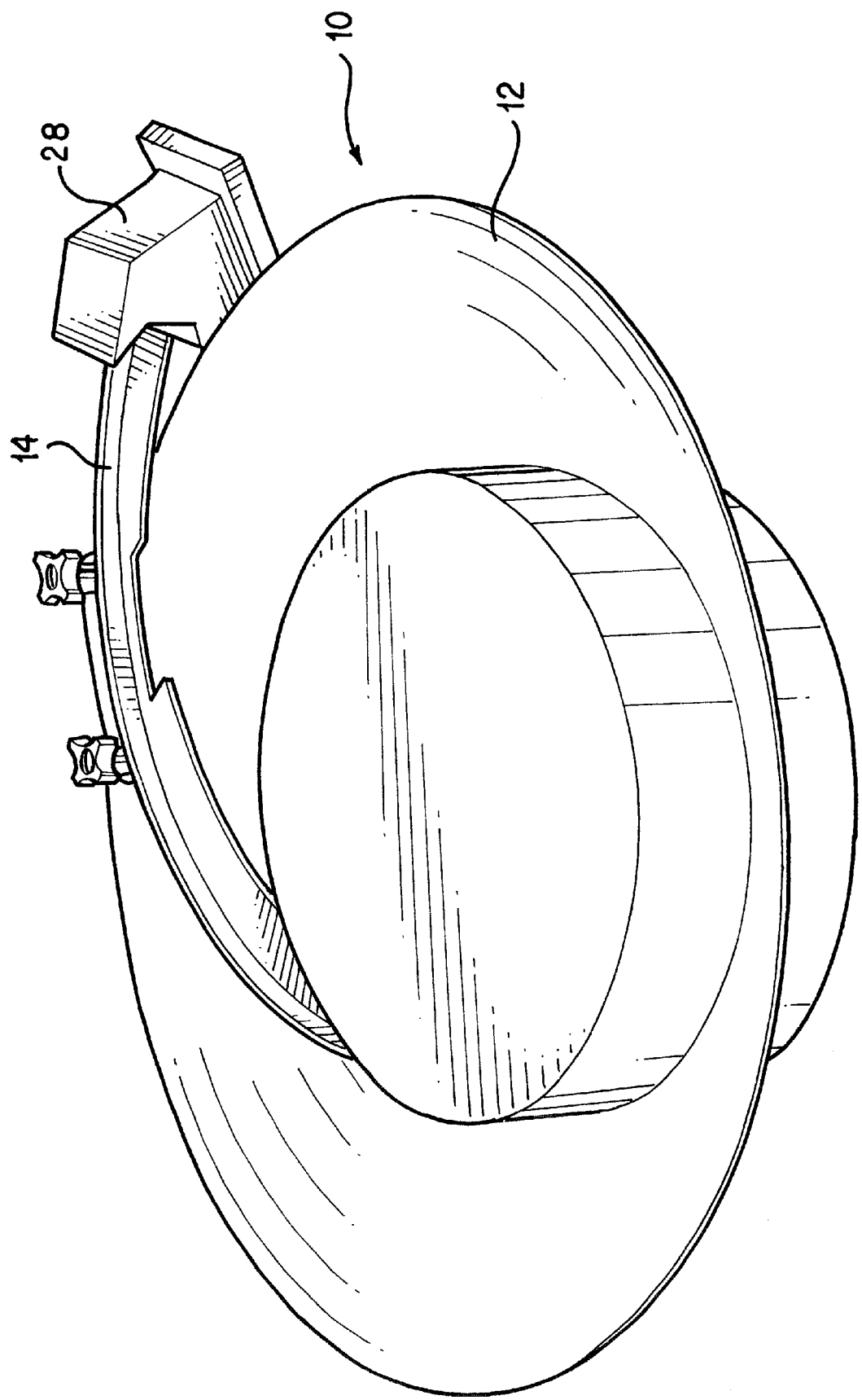
FIG. 5 is a perspective view of a bowl feeder showing a feeder cone and showing only a single track for illustrative clarity.
Figure 6:
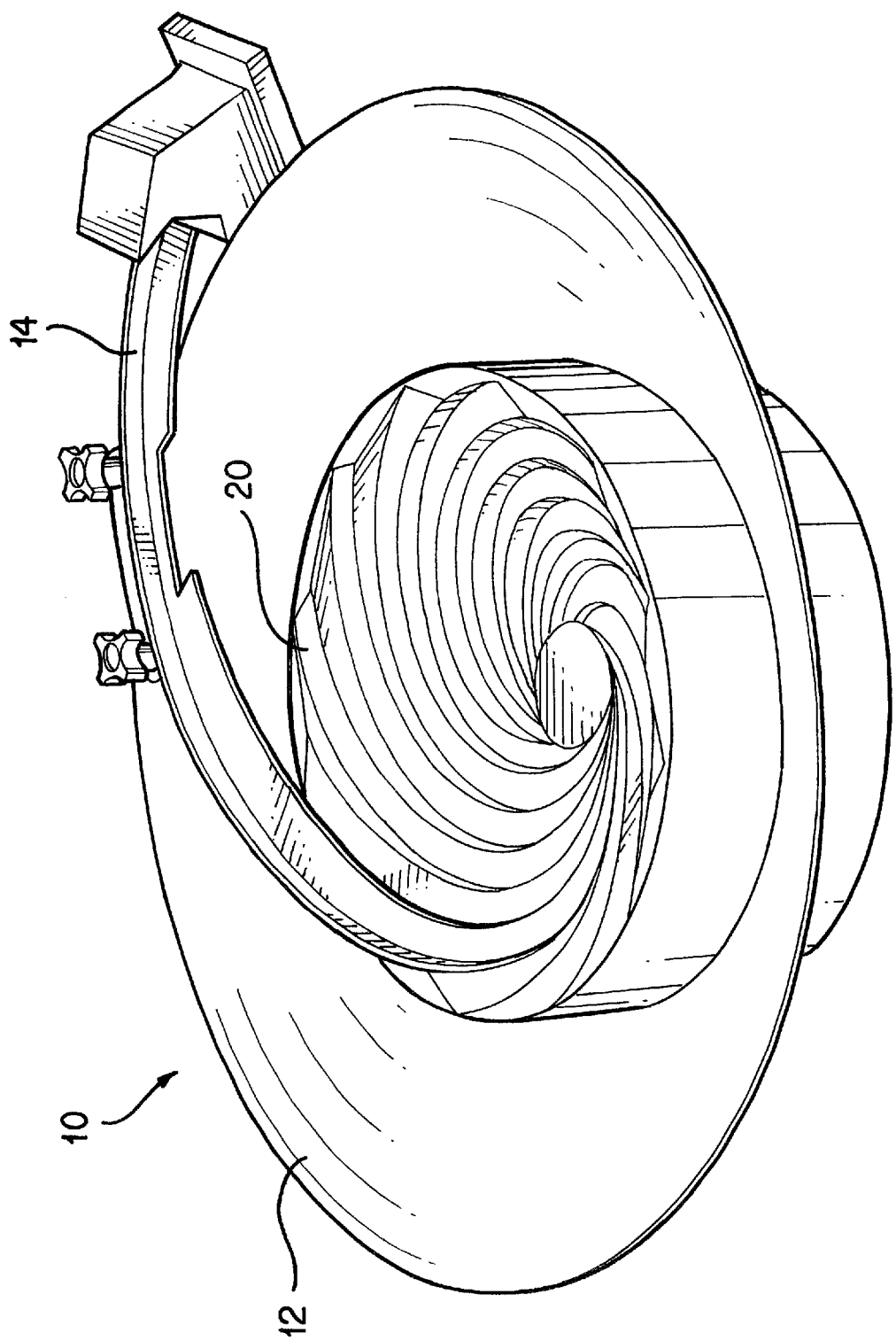
FIG. 6 is a perspective view of a bowl feeder showing a feeder cone for feeding product from the bottom and showing only a single track for illustrative clarity.
Figure 7:
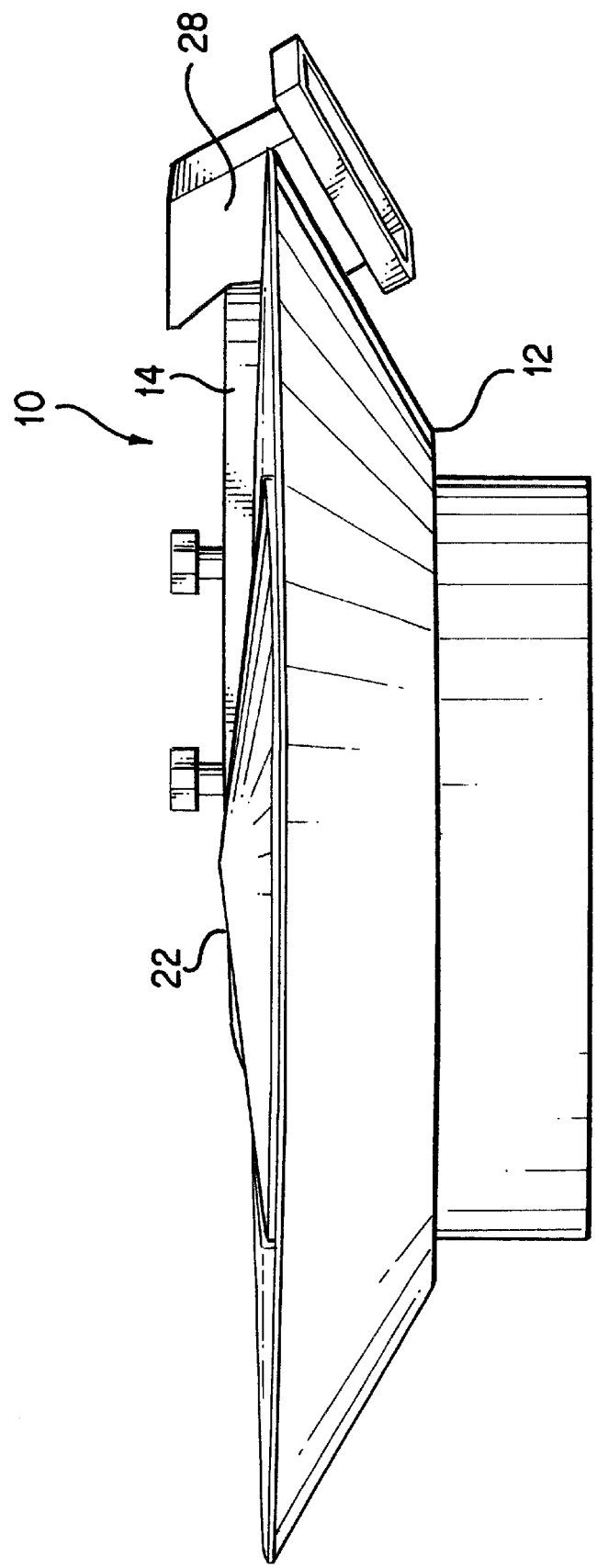
FIG. 7 is an elevational view of a bowl feeder showing another form of feeder cone and showing only a single track for illustrative clarity.
Figure 8:
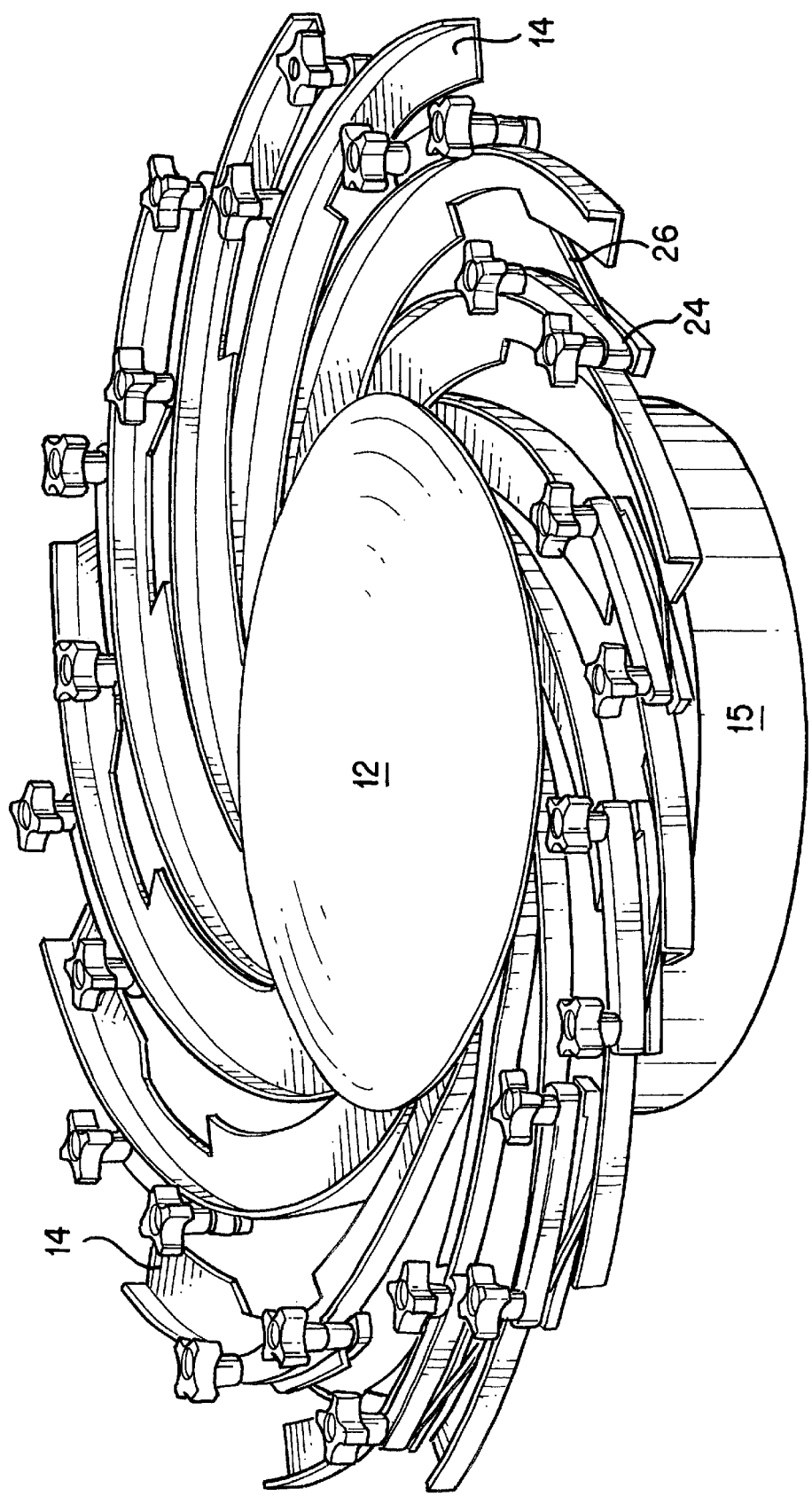
FIG. 8 is a perspective view of a bowl feeder similar to FIG. 3.
Figure 12:
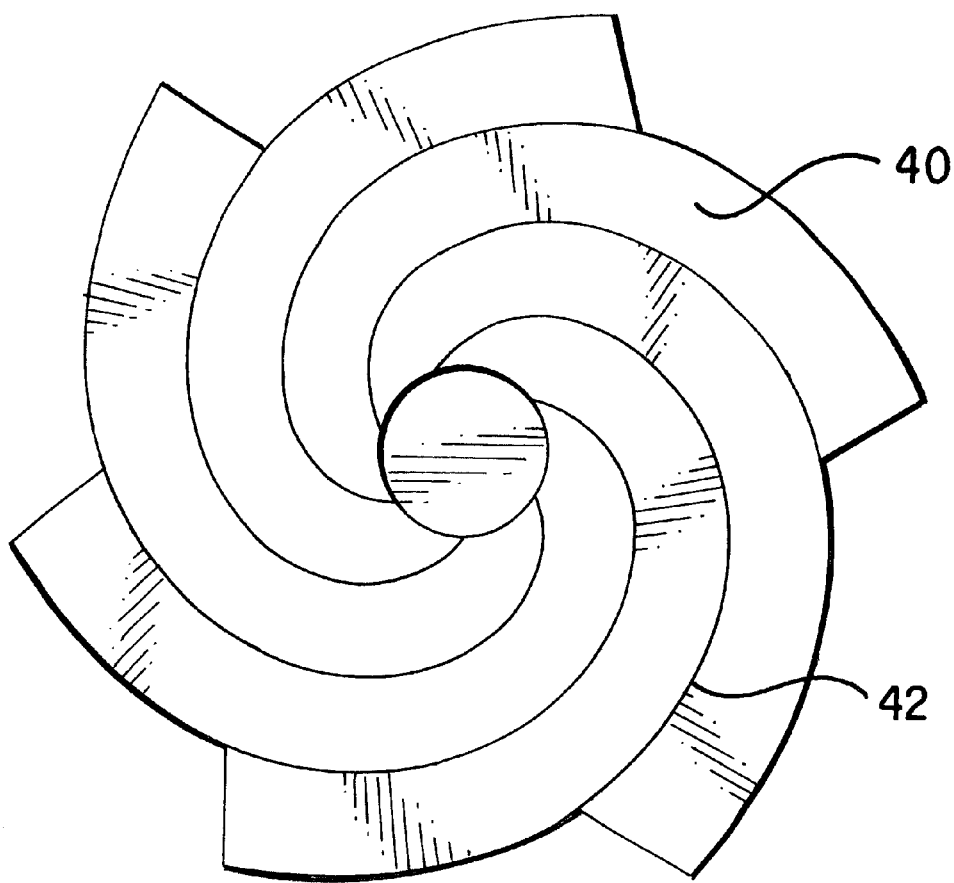
FIG. 12 is a plan view of the inventive bowl according the second aspect of the invention.
Figure 13:
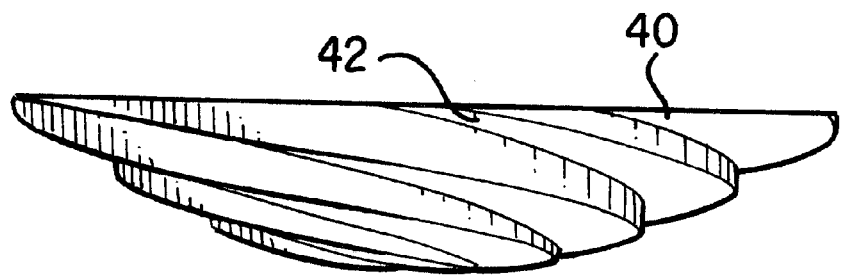
FIG. 13 is an elevational view of the bowl of FIG. 12.
Figure 14:
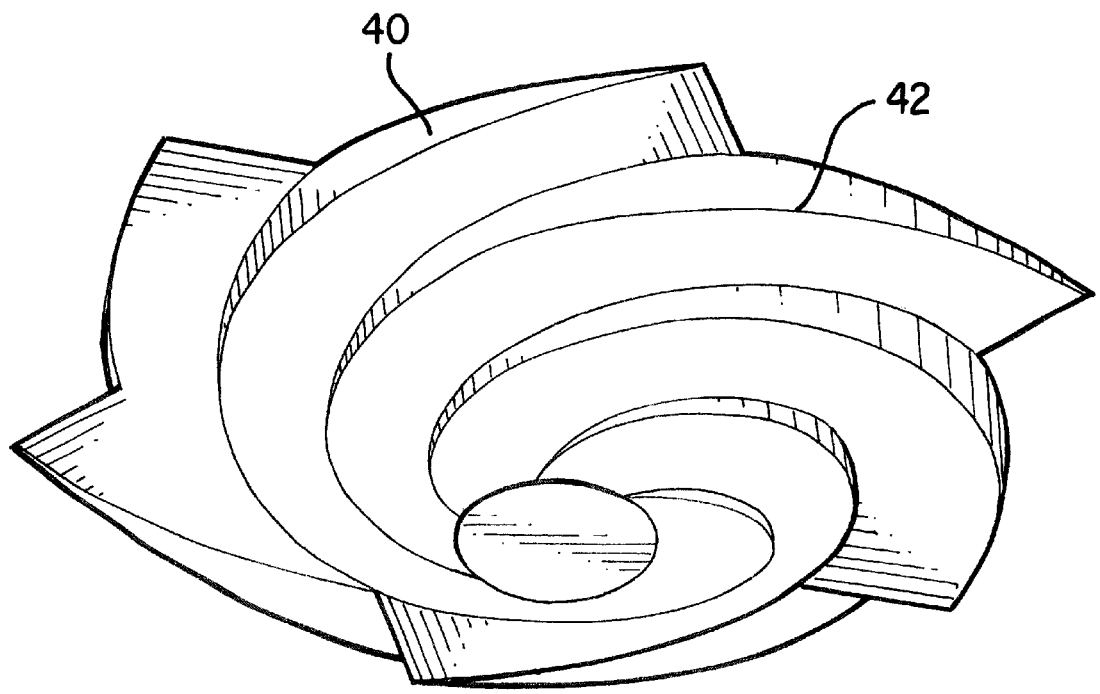
FIG. 14 is a perspective view of the bowl of FIG. 12.
Figure 15:
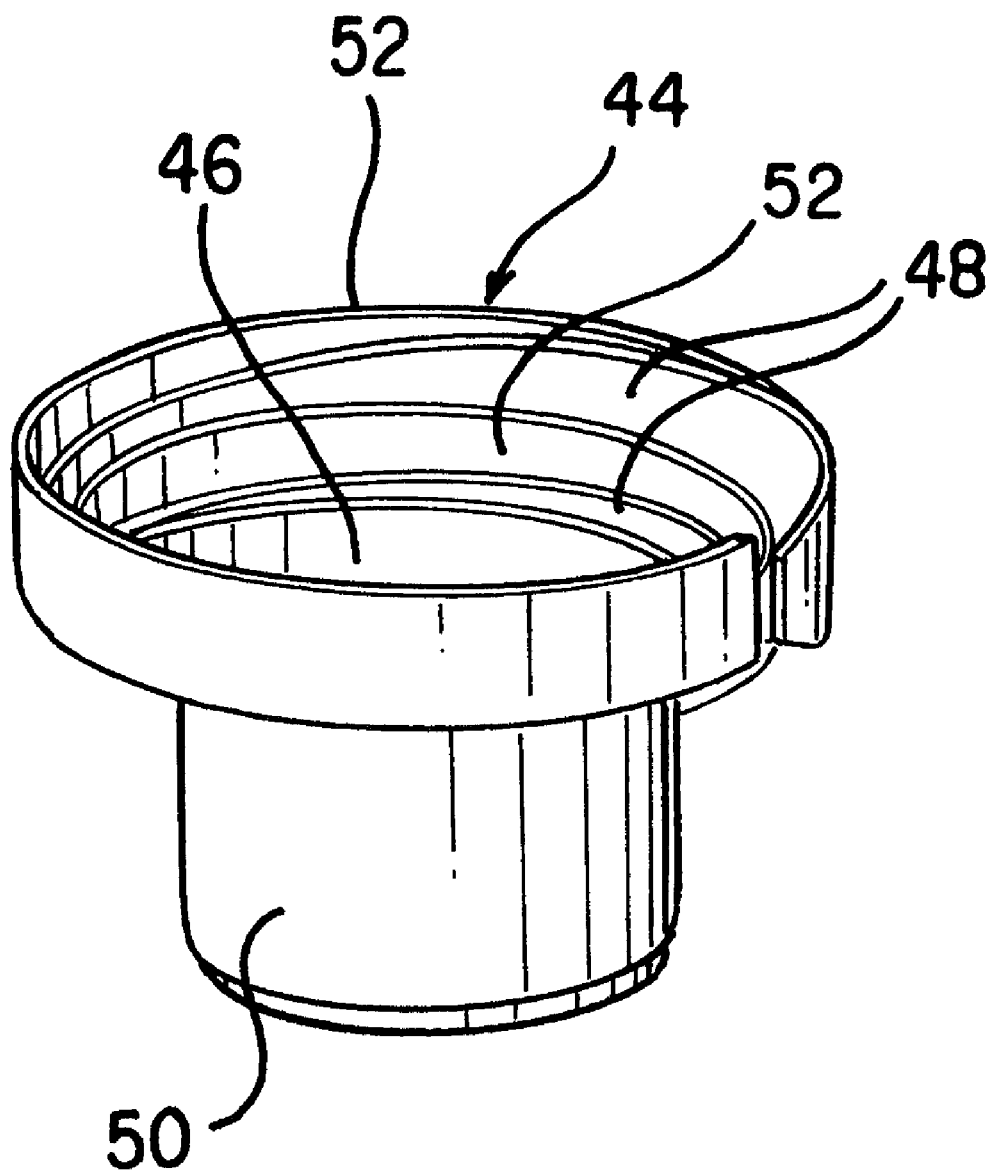
FIG. 15 is a perspective view of a conventional apparatus.

The central receiving section 12 can be in the form of an inverted cone as shown in FIGS. 1–4. Alternatively, it could be in the form of a cone-shaped structure having walls which taper outwardly and upwardly as shown in FIG. 5 and, optionally, with a flat upstanding central structure 16 to direct the flow of items up and out of the bowl into the tracks. Another alternative is a generally conical central portion 18 having upward spiral passages 20 leading to the tracks 14 as shown in FIG. 6 (see, also, FIGS. 12–14). Yet another variation uses an inverted conical structure 22 within a conical bin as shown in FIG. 7. These various structures are chosen by those skilled in the art depending on the nature of the items to be counted and/or separated.

Track width adjustors or air jets 24 may be provided to force the items moving along the track to assume a single file, with excess items then falling off and being collected in a tray 26 to be cycled back to the feed.

Any suitable device for counting, sorting, combining, weighing, separating, or the like can be affixed to the ends of the tracks as shown schematically at 28. Different such devices can be used on different tracks. The device of this invention may be used to separate any items which are provided in bulk and are to be separately packaged or counted for packaging. Such items include pills, electronic parts, mechanical parts, julienne-cut potatoes for frying, hardware, toy pieces, etc.

Figure 9:
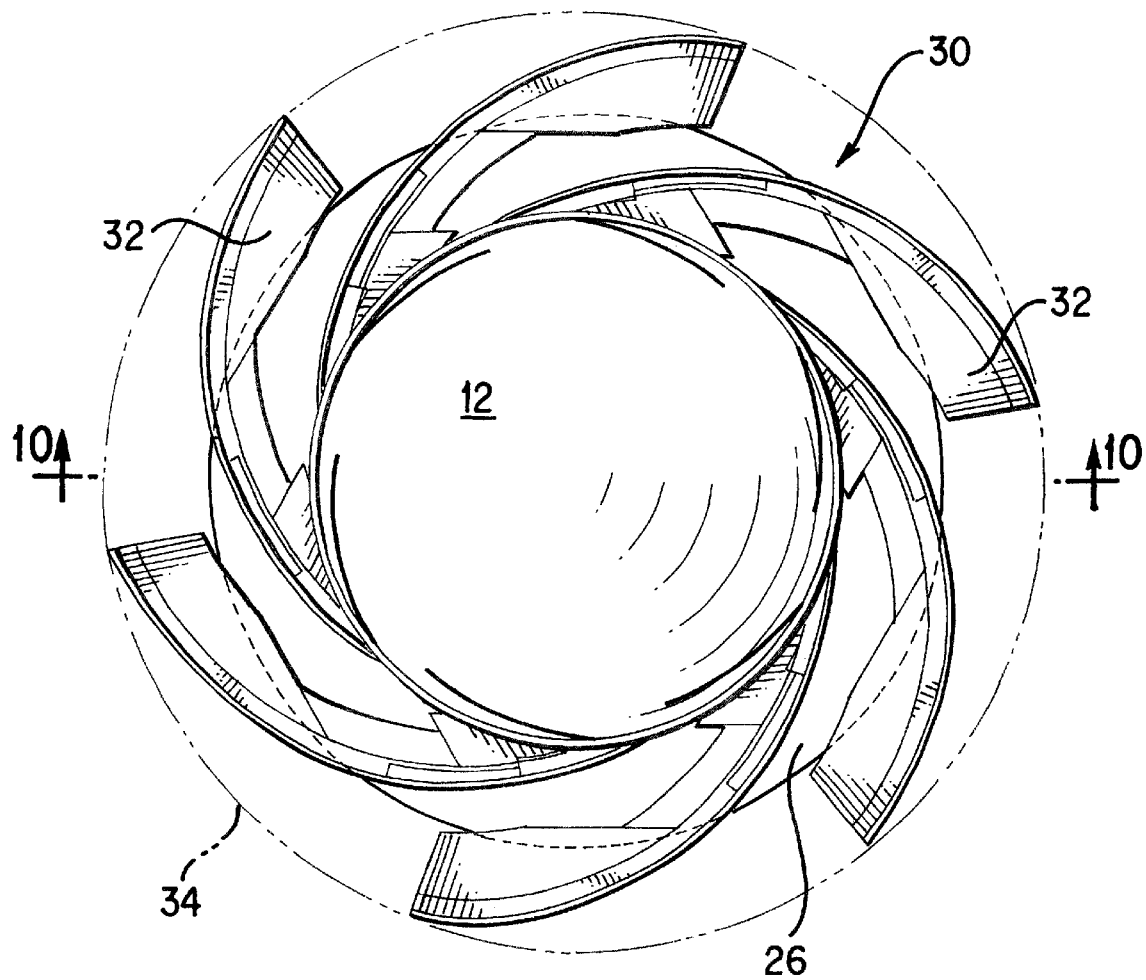
FIG. 9 is a plan view of another embodiment of a bowl feeder according to the invention.
Figure 10:
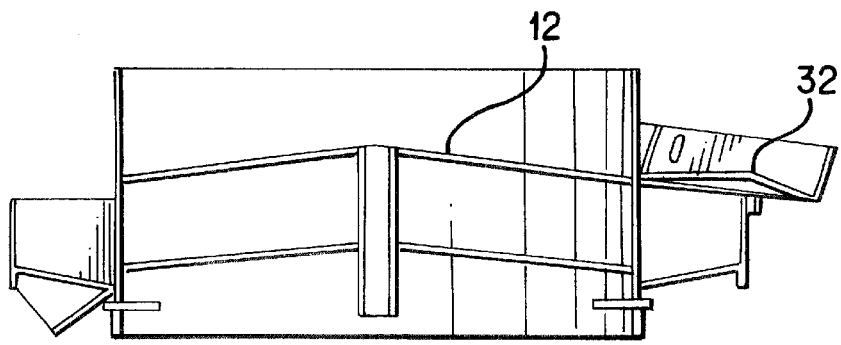
FIG. 10 is a cross-section of the bowl feeder taken along the line 10—10 of FIG. 9.

Turning to FIG. 9, there is shown a bowl feeder generally designated by the numeral 30. The bowl feeder 30 comprises a central receiving section 12 and six tracks 32, spiraling out from the central receiving section. As mentioned earlier, there could be as few as two tracks and as many as about 50 tracks. The complete apparatus is vibrated using a known vibrating drive (not shown).

The central receiving section 12 is preferably in the form of an inverted cone but could take another configuration depending on the articles to be processed. The width of the tracks may be adjusted using known tooling to force the items moving along the track to assume a single file, or oriented single file, with excess items then falling off and being collected in a tray 26 to be cycled back to the feed. The term "tooling" is commonly used in the trade to refer to walls, guides, diverters, baffles, rails, and other such fabricated structures which are added to the bowl for a particular purpose, all as well-known in the art.

As shown in FIG. 9, the tracks 32 are evenly spaced around the periphery of the bowl. Each of the tracks 32 is arcuate following a spiral path, i.e., a path of ever changing radius, or a circular path. When the paths are circular, the centers of the circles lie on a circle which is inside of, and coaxial with, the bowl 12. All the arcuate tracks 32 which radiate out from the central receiving section 12 are geometrically the same and are circumscribed in circle 34.

Figure 11:
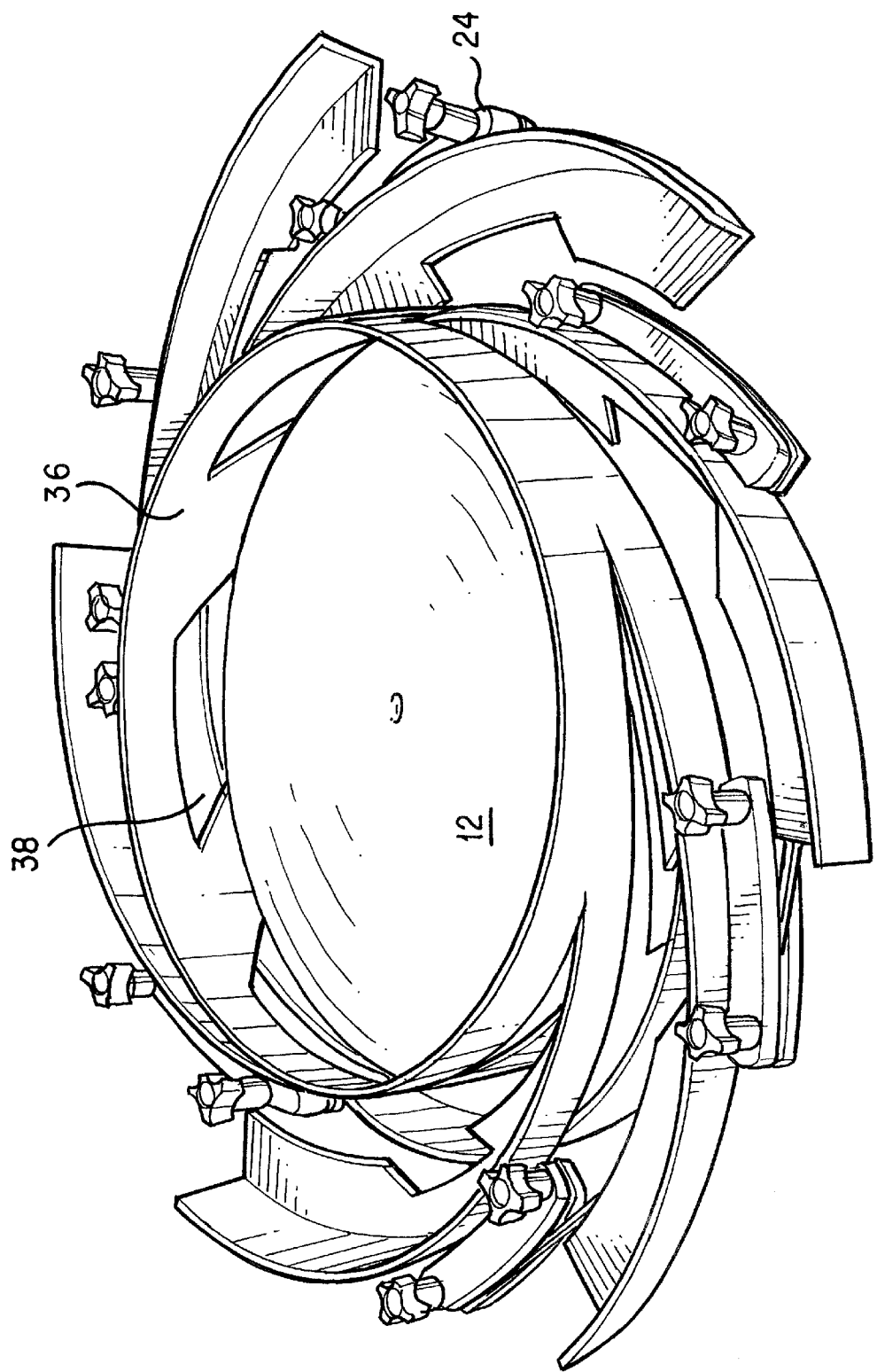
FIG. 11 is a perspective view of the bowl feeder of FIG. 9.

While a rotating feeder bowl moves the product outwardly by centrifugal force, the vibratory feeder bounces the product up and outwardly in a circle. The product then reaches wall 36 (FIG. 11). Wall 36 has a plurality of openings 38 through which the product passes onto tracks 32. The whole unit vibrates and the product spreads out and marches down the tracks 32. Then the product moves to chutes to a bottling machine or the like, or to a common funnel, or to a counter.

The inventive bowl 40 has spiral vanes, tracks, divertors, or other similar devices, all generally designated by the numeral 42, affixed to its interior surfaces that will guide and encourage the product to climb out of and spread itself evenly and uniformly out of the periphery of the device. The spiral tracks and/or vanes are ever growing in size as they climb up and out of the dome. Using the increasing thickness of the track with elevation to meter the amount of product carried and delivered out of the cone (the more bulk is in the cone, the higher the pile) the more product will be delivered out of the cone. Spiral tracks and/or walls may be used to align long products such as French fries so as to allow an accumulator to redirect oriented product resulting in more compact bags (packages) and less product damage.

The bowls, tracks, and other components of the instant invention may be made of any material such as aluminum or stainless steel depending on the nature of the articles to be handled, as is well-known in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for feeding, singulating, or orienting articles comprising a feeder bowl having a central receiving section which receives said articles in bulk, and a plurality of tracks radiating spirally outwardly from the feeder bowl along which said articles move to thereby be fed, singulated, or oriented.

2. A device for feeding, singulating, or orienting articles as defined in claim 1, wherein said feeder bowl is a vibratory feeder bowl and said articles move outwardly in said bowl and then to said plurality of tracks by vibration.

3. A device for feeding, singulating, or orienting articles as defined in claim 1, further comprising a drive unit.

4. A device for feeding, singulating, or orienting articles as defined in claim 3, wherein said drive unit imparts vibratory motion to said device.

5. A device for feeding, singulating, or orienting articles as defined in claim 3, where in s aid drive unit rotates said feeder bowl.

6. A device as defined in claim 1 wherein said central receiving section is convex conical in cross-section.

7. A device as defined in claim 1 wherein said central receiving section is concave conical in cross-section.

8. A device as defined in claim 1 wherein said central receiving section is essentially flat in cross-section.

9. A device for feeding, singulating, or orienting articles as defined in claim 1, comprising at least 2 tracks.

10. A device for feeding, singulating, or orienting articles as defined in claim 9, comprising from 2 to about 50 tracks.

11. A device for feeding, singulating, or orienting articles as defined in claim 1, wherein each of said tracks is arcuate, following a circular path with the centers of the circles lying on a circle which is inside of, and coaxial with, the bowl.

12. A device for feeding, singulating, or orienting articles as defined in claim 1, wherein each of said tracks is arcuate, following a path of ever changing radius.

13. A device for feeding, singulating, or orienting articles as defined in claim 1, wherein said tracks are evenly spaced about the periphery of said feeder bowl.

14. A feeder bowl comprising a plurality of spiral elements affixed to its interior surfaces to guide and encourage articles to be sorted to climb out of and spread evenly and uniformly out of the periphery of the bowl, said spiral elements growing in size as they climb up and out of the bowl.

15. A feeder bowl as defined in claim 14, wherein said spiral elements are selected from the group consisting of vanes, tracks, and divertors.

* * * * *